(12) United States Patent
Song et al.

(10) Patent No.: US 9,933,796 B2
(45) Date of Patent: Apr. 3, 2018

(54) SOCIAL LEARNING SOFTTHERMOSTAT FOR COMMERCIAL BUILDINGS

(71) Applicant: Siemens Corporation, Orlando, FL (US)

(72) Inventors: Zhen Song, Plainsboro, NJ (US); Lingyun Wang, Princeton, NJ (US); Yan Lu, West Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 382 days.

(21) Appl. No.: 14/426,851

(22) PCT Filed: Sep. 12, 2013

(86) PCT No.: PCT/US2013/059396
§ 371 (c)(1),
(2) Date: Mar. 9, 2015

(87) PCT Pub. No.: WO2014/043313
PCT Pub. Date: Mar. 20, 2014

(65) Prior Publication Data
US 2015/0247646 A1    Sep. 3, 2015

Related U.S. Application Data

(60) Provisional application No. 61/700,537, filed on Sep. 13, 2012.

(51) Int. Cl.
G05D 23/19       (2006.01)
F24F 11/00       (2018.01)
G05B 15/02       (2006.01)

(52) U.S. Cl.
CPC ........ *G05D 23/1932* (2013.01); *F24F 11/006* (2013.01); *G05B 15/02* (2013.01);
(Continued)

(58) Field of Classification Search
CPC ............ F24F 11/006; F24F 2011/0064; F24F 2011/0075; F24F 2221/38;
(Continued)

(56) References Cited

U.S. PATENT DOCUMENTS 5,303,767 A  *  4/1994  Riley ..................... F24F 3/044
                                                   165/208
6,178,362 B1 *  1/2001  Woolard ................ G01R 22/00
                                                   700/28
(Continued)

FOREIGN PATENT DOCUMENTS

CN         101583831 A     11/2009
CN         101589351 A     11/2009
(Continued)

OTHER PUBLICATIONS

Chinese Report of Examination dated Dec. 16, 2016; Application No. 201380059089.2; pp. 20.
(Continued)

*Primary Examiner* — Crystal J Barnes-Bullock

(57) ABSTRACT

A building has climate control equipment which controls a temperature at different locations. Different locations may be in different control zones controlled by different control devices. An occupant of a location submits a desired location temperature through a user interface on a computing device to a networked server. Setting of a desired temperature is constrained by energy saving policies and by conditions of surrounding locations. An arbitrator device determines based on constraints a new temperature setting. The new temperature setting is accompanied by an energy saving feedback. The occupants confirms the new setting. A climate control device is instructed to apply a device setting to
(Continued)

achieve the new temperature. A climate profile of the occupant is learned from previous temperature settings by the occupant.

17 Claims, 12 Drawing Sheets

(52) U.S. Cl.
CPC .. *G05D 23/1902* (2013.01); *F24F 2011/0064* (2013.01); *F24F 2011/0075* (2013.01); *F24F 2221/38* (2013.01)

(58) Field of Classification Search
CPC . F24F 2011/0034; G05B 15/02; G05B 19/02; G05B 2219/2642; G05D 23/1902; G05D 23/1932; G06F 1/3203; G06F 17/5004; G06Q 10/06; G06Q 10/0637; G06Q 10/10; G06Q 50/06; H02J 13/0086; Y04S 20/322; Y04S 50/10
See application file for complete search history.

(56) References Cited

U.S. PATENT DOCUMENTS

| | | | | |
|---|---|---|---|---|
| 6,636,893 | B1* | 10/2003 | Fong | G01R 22/00 370/252 |
| 2003/0216971 | A1* | 11/2003 | Sick | G01D 4/004 705/7.36 |
| 2006/0010388 | A1* | 1/2006 | Imhof | G05B 15/02 715/734 |
| 2008/0249756 | A1* | 10/2008 | Chaisuparasmikul | G06F 17/5004 703/13 |
| 2009/0083167 | A1* | 3/2009 | Subbloie | G06Q 30/04 705/34 |
| 2010/0036533 | A1 | 2/2010 | Hashimoto | |
| 2010/0262298 | A1* | 10/2010 | Johnson | F24F 11/001 700/277 |
| 2010/0286841 | A1* | 11/2010 | Subbloie | G06F 1/28 700/295 |
| 2012/0022702 | A1* | 1/2012 | Jang | F24F 11/006 700/277 |
| 2012/0031984 | A1 | 2/2012 | Paradiso | |
| 2013/0054033 | A1* | 2/2013 | Casilli | H04L 12/282 700/276 |
| 2013/0231792 | A1* | 9/2013 | Ji | G05B 19/02 700/291 |
| 2013/0274940 | A1* | 10/2013 | Wei | G05B 19/02 700/291 |
| 2014/0316586 | A1* | 10/2014 | Boesveld | H04Q 9/00 700/278 |
| 2017/0199503 | A1* | 7/2017 | Subbloie | G05B 15/02 |

FOREIGN PATENT DOCUMENTS

| | | |
|---|---|---|
| CN | 101995072 A | 3/2011 |
| CN | 102449406 A | 5/2012 |

OTHER PUBLICATIONS

Kamilaris A. et al; "Social Networking of the Smart Home"; 2010 IEEE 21st International Symposium on Personal Indoor and Mobile Radio Communication, Piscataway, NJ; pp. 2632-2637; ISBN: 978-1-4244-8017-3; XP031838054; 2010; US; Sep. 26, 2010.

\* cited by examiner

SOCIAL LEARNING SOFTTHERMOSTAT FOR COMMERCIAL BUILDINGS

CROSS REFERENCE TO RELATED APPLICATIONS

The present application claims priority to and the benefit of U.S. Provisional Patent Application Ser. No. 61/700,537 filed on Sep. 13, 2012.

TECHNICAL FIELD

The present invention is related to systems and methods for temperature regulation in a commercial building. More in particular it relates to methods and systems for collaboratively managing a climate system in a building hosting multiple occupants.

BACKGROUND

In typical commercial buildings, facility managers often do not have thorough knowledge on the comfort preferences of individual occupants. Therefore, it is hard to ensure comfort and energy saving at the same time. Since one facility manager may serve hundreds to thousands of occupants, ad hoc communications, such as face-to-face talk, email or telephone, are not effective, especially when occupants' preference may be conflictive, or not feasible due to hardware limitations.

Under one circumstance, facility managers who implement aggressive energy policies often achieve energy savings with some or significant sacrifice in occupant comfort. Under some of other circumstances, facility managers often must relax their energy policies to avoid occupant complaints, reducing the opportunity for energy savings. While the worst circumstances are also most common, where facility managers often over-react to occupant complaints by setting cooling set points too low or raising heating set points too high, which brings both energy waste and occupant comfort complaints.

Systems and methods that allow climate control that collaboratively address comfort concerns from building occupants and energy waste concerns are currently not available.

Accordingly, novel and improved methods and systems for collaboratively determining a climate control setting are required.

SUMMARY

In accordance with an aspect of the present invention systems and methods are provided to arbitrate preferred temperature settings of a first and a second location in a building for a climate control device that affects the temperature of the first and the second location based on an optimization criterion. The arbitrated setting is learned and/or applied through a social network In accordance with an aspect of the present invention a method is provided for determining in a first building with a first location and a second location a first temperature setting of a climate control device enabled to affect the first and the second location, comprising a processor enabled to receive from a first user interface on a first computing device an instruction for a preferred temperature for the first location and the processor enabled to receive from a second user interface on a second computing device an instruction for a preferred temperature for the second location and the processor arbitrating the received preferred temperature settings based on a constraint to set the climate control device to determine a first arbitrated temperature setting as the first temperature setting, wherein the arbitrating is based on an optimization criterion.

In accordance with a further aspect of the present invention, a method is provided, wherein the optimization criterion minimizes the difference between the preferred temperature of the first location and the first arbitrated temperature setting and the preferred temperature of the second location and the first arbitrated temperature setting.

In accordance with yet a further aspect of the present invention, a method is provided, wherein the constraint is based on an energy policy.

In accordance with yet a further aspect of the present invention, a method is provided, wherein the constraint is based on an input provided by a facility manager.

In accordance with yet a further aspect of the present invention, a method is provided, wherein the preferred temperature of the first location is applied by the processor to create a temperature profile of an occupant of the first location.

In accordance with yet a further aspect of the present invention, a method is provided, wherein the temperature profile of the occupant is accessible through a social network.

In accordance with yet a further aspect of the present invention, a method is provided, wherein a second temperature setting of the climate control device is based on the temperature profile of the occupant.

In accordance with yet a further aspect of the present invention, a method is provided, wherein the processor determines the first arbitrated temperature setting based on preferred temperatures of at least 5 different locations in the building.

In accordance with yet a further aspect of the present invention, a method is provided, wherein the processor is part of an existing Building Automation System (BAS).

In accordance with yet a further aspect of the present invention, a method is provided, further comprising the occupant occupying a third location in the first building and the processor accessing the temperature profile of the occupant to determine a temperature setting of a climate control device related to the third location.

In accordance with yet a further aspect of the present invention, a method is provided, wherein the first location is in a first zone in the first building and the constraint is based on a temperature difference between the first location and the second location in the first building.

In accordance with yet a further aspect of the present invention, a method is provided, wherein the occupant is enabled to change the temperature profile.

In accordance with yet a further aspect of the present invention, a method is provided, further comprising setting a temperature by a system for climate control in a second building by accessing the temperature profile of the occupant through the network.

In accordance with yet a further aspect of the present invention, a method is provided, wherein the temperature profile of the occupant is accessible from a social network.

In accordance with another aspect of the present invention, a system is provided, to determine in a first building with a first location and a second location a first temperature setting of a climate control device enabled to affect the first and the second location, comprising a memory enabled to store data, including instructions, a processor enabled to execute instructions retrieved from the memory to perform the steps: receiving from a first user interface on a first computing device an instruction for a preferred temperature for the first location and the processor enabled to receive from a second user interface on a second computing device an instruction for a preferred temperature for the second location and arbitrating the received preferred temperature settings based on a constraint to set the climate control device to determine a first arbitrated temperature setting as the first temperature setting, wherein the arbitrating is based on an optimization criterion.

In accordance with yet another aspect of the present invention, a system is provided, wherein the optimization criterion minimizes the difference between the preferred temperature of the first location and the first arbitrated temperature setting and the preferred temperature of the second location and the first arbitrated temperature setting.

In accordance with yet another aspect of the present invention, a system is provided, wherein the preferred temperature of the first location is applied by the processor to create a temperature profile of an occupant of the first location.

In accordance with yet another aspect of the present invention, a system is provided, wherein the temperature profile of the occupant is accessible through a social network.

In accordance with yet another aspect of the present invention, a system is provided, wherein a second temperature setting of the climate control device is based on the temperature profile of the occupant.

In accordance with yet another aspect of the present invention, a system is provided, wherein the processor is part of an existing Building Automation System (BAS).

DRAWINGS

DESCRIPTION

Figure 1:
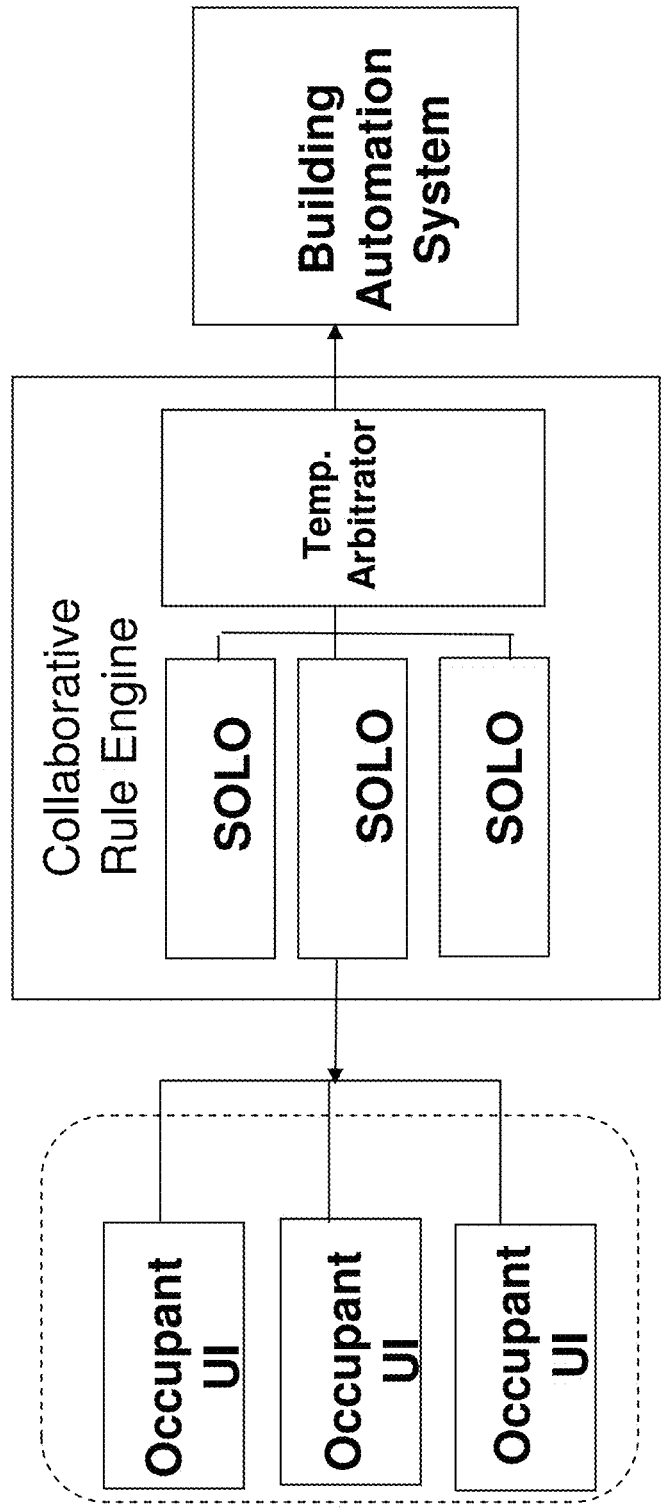
FIG. 1 illustrates in diagram a software architecture in accordance with one or more aspects of the present invention.

In accordance with an aspect of the present invention a social learning thermostat identified as softThermostat for commercial building energy savings and comfort enhancement is provided. This softThermostat, which will be indicated herein by the name SOLO, is a software application hosted on a collaborative energy and comfort control (CECC) platform, which engages occupants of a facility or building in energy policy making by arbitrating conflictive requirements among occupants and facilitates communication among the stake holders in commercial buildings.

In accordance with an aspect of the present invention, a facility manager allocates an occupant with a personal SOLO, which can be accessed via web browsers on desktop or mobile devices. In one embodiment of the present invention, each occupant is authorized to initiate the SOLO as an web App for their use. If occupants prefer to use SOLO, instead of other software thermostat, they can set SOLO as their default thermostat.

In accordance with an aspect of the present invention, a personal SOLO is associated with a location in the building or facility. Every time an occupant adjusts the temperature preference or if an occupant changes the occupancy status of the associated location, SOLO learns from the inputs and updates the user profile.

With detailed information on occupants' schedule and preferences profile, significant energy saving can be achieved without sacrifice on comfort. The user interface of SOLO is built on modern web technologies, such as HTML5 and Javascript, with back end learning algorithm and temperature arbitration algorithm.

Buildings account for 39% energy usage and 68% for electrical consumptions in America as described in "[1] Optimize Energy Use, by the *Whole Building Design Guide (WBDG) Sustainable Committee* Available: http://www.wbdg.org/design/minimize_consumption.php." Due to the large base line, saving every percentage of energy usage is very valuable. One approach is to improve system energy efficiency and detect existing bugs via re-commissioning process as described in "[5] L. Kramer, "Comprehensive energy management and CC at DFW airport," in International Conference for Enhanced Building Operations (ICEBO), New York City, 2011", such as detecting software and hardware faults and optimizing system internal set points, e.g., chilling coil temperature set points etc.

For typical commercial buildings, efficient devices and correct control logics are necessary but not enough, because occupants' behaviors have tremendous impacts to the energy consumption. Responsive occupant behaviors may introduce up to 80% energy savings as described in "[6] Heller, J., Morgan Heater, and Mark Frankel, 2011. Sensitivity Analysis: Comparing the Impact of Design, Operation, and Tenant Behavior on Building Energy Performance. NBI, New Buildings Institute." Current Building Automation System (BAS) operates in the "top down" model, where facility manager or building operator is the only commander of BASs and occupants are expelled from the policy making. For instance, there is no specialized software system to take occupants' inputs such as their individual calendars and temperature preferences. The control logic is typically implemented in one of the building control languages, such as Siemens PPCL. Modifying the logic (changing policy) requires professional programmers and significant efforts, since software bugs may result in damage of expensive equipments, even safety of people. As a result, building control logic usually does not change over years, despite changes of occupants' behaviors.

There are at least two major sources for occupant-engaged control to achieve energy savings at supervisory control level: individual scheduling and individual preference. In today's commercial buildings, energy related control policies, such as HVAC set points and lighting schedules, are often defined and implemented much longer than 8 hours per day, in order to cover both the earliest and the latest employee in the office, for instance from 5 am to 10 pm to provide thermal, ventilation and illumination comfort for designed maximum occupancy. In addition, equipments often operate during weekends and holidays. There are limited means to measure the real number of occupants in the building and there is no technical methods to collect occupants' preferences in real time.

In typical commercially buildings, facility managers do not have thorough knowledge on the comfort preferences of individual occupants, therefore it is hard to ensure comfort and energy saving at the same time. Since one facility manager may serve hundreds to thousands of occupants, ad hoc communications, such as face-to-face talk, email or telephone, are not effective, especially when occupants' preference may be conflictive, or not feasible due to hardware limitations. Under one circumstance, facility managers who implement aggressive energy policies often achieve energy savings with some or significant sacrifice in occupant comfort; under some of other circumstances, facility managers often must relax their energy policies to avoid occupant complaints, reducing the opportunity for energy savings; while the worst circumstances are also most common, where facility managers often over-react to occupant complaints by setting cooling set points too low or raising heating set points too high, which brings both energy waste and occupant comfort complaints.

System Overview

Software Architecture

In accordance with an aspect of the present invention a Collaborative Energy and Comfort Control (CECC) software platform is provided on top of a traditional Building Automation System (BAS) layer. Thus, there is no need to replace existing hardware. While existing learning thermostats are all hardware-based, which requires hardware replacement, cable wiring, and existing thermostats do not result conflictive requirements from the occupants. The software architecture is shown in FIG. 1. The platform includes several components: an Occupant User Interface (UI) and a Collaborative Rule Engine, wherein SOLO (the softThermostat) and the software Arbitrator are sub-components. The Temperature Arbitrator provides control instructions to the BAS after evaluating all SOLOs.

Figure 2:
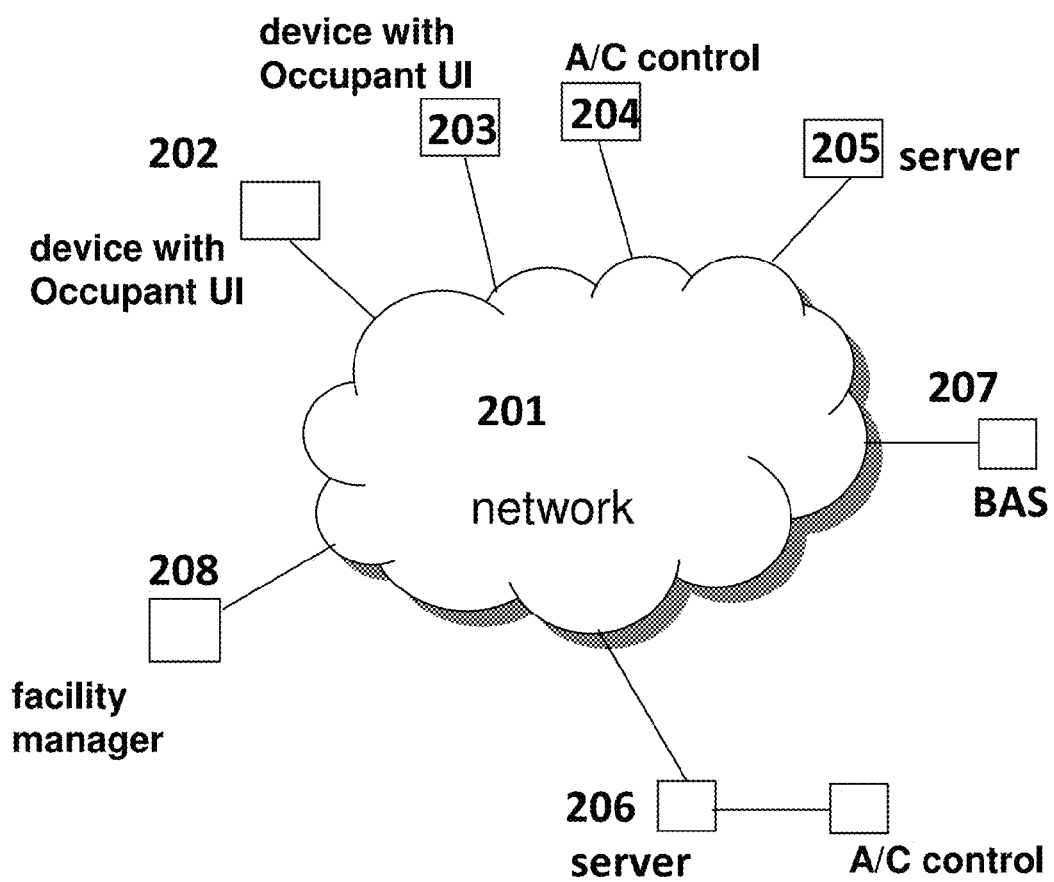
FIG. 2 illustrates a network based system in accordance with one or more aspects of the present invention.

In one embodiment of the present invention the CECC platform is a network based system, as illustrated in FIG. 2. A user device 202, which may be a computer, a tablet, a cell phone or any computing device enabled to connect wirelessly or in a wired manner to a network 201, is enabled to provide an Occupant UI to collect data for the CECC. Commonly, such an interface is a display or a screen with data entry capabilities such as keys or cursor or touch screen based data entry capabilities. However, an Occupant User Interface may also be an audio interface that provides audio signals and accepts audio signals such as speech. The network 201 is enabled to connect a plurality of computing devices and may be the Internet. At least two devices with Occupant UIs (202 and 203) are connected to the network 201, though not necessarily at the same time. However, each device of 202 and 203 may provide Occupant preferences that may be different and conflictive.

In one embodiment of the present invention a server 205 is connected to the network. This server may generate the Occupant UIs, for instance after a device such as 202 or 203 has signed-on to the server 205. The server 205 may host a social network. It may also be a server dedicated to provide CECC services. In one embodiment of the present invention a device 204, which may be an A/C system control panel or any other relevant climate controller is also connected to the network 201 and may be receive control signals from a server such as 205.

In one embodiment of the present invention a Building Automation System (BAS) 207 is connected to the network and receives input directly from 202 or 203 or via 205. In one embodiment of the present invention the network 201 is a stand-alone network such as a Local Area Network. In one embodiment of the present invention a BAS with included climate control devices is part of a server 206 or is connected via server 206 which is connected to network 201. A facility manager terminal 208 has system control capabilities, can set an allowed range of temperatures or override any setting. Other configurations are possible and are fully contemplated. A single access point to a public networks allows for better monitoring of the server and BAS for possible security issues.

Through CECC, occupants can submit their temperature preferences via an Occupant UI. The Collaborative Rule Engine takes occupants' preferences inputs from UI and rules (policies) input from XML files. Each UI has a corresponding SOLO in the engine to represent the occupant. The Arbitrator detects and resolves conflicts from different occupants and generates consistent set points for the BAS.

Figure 3:
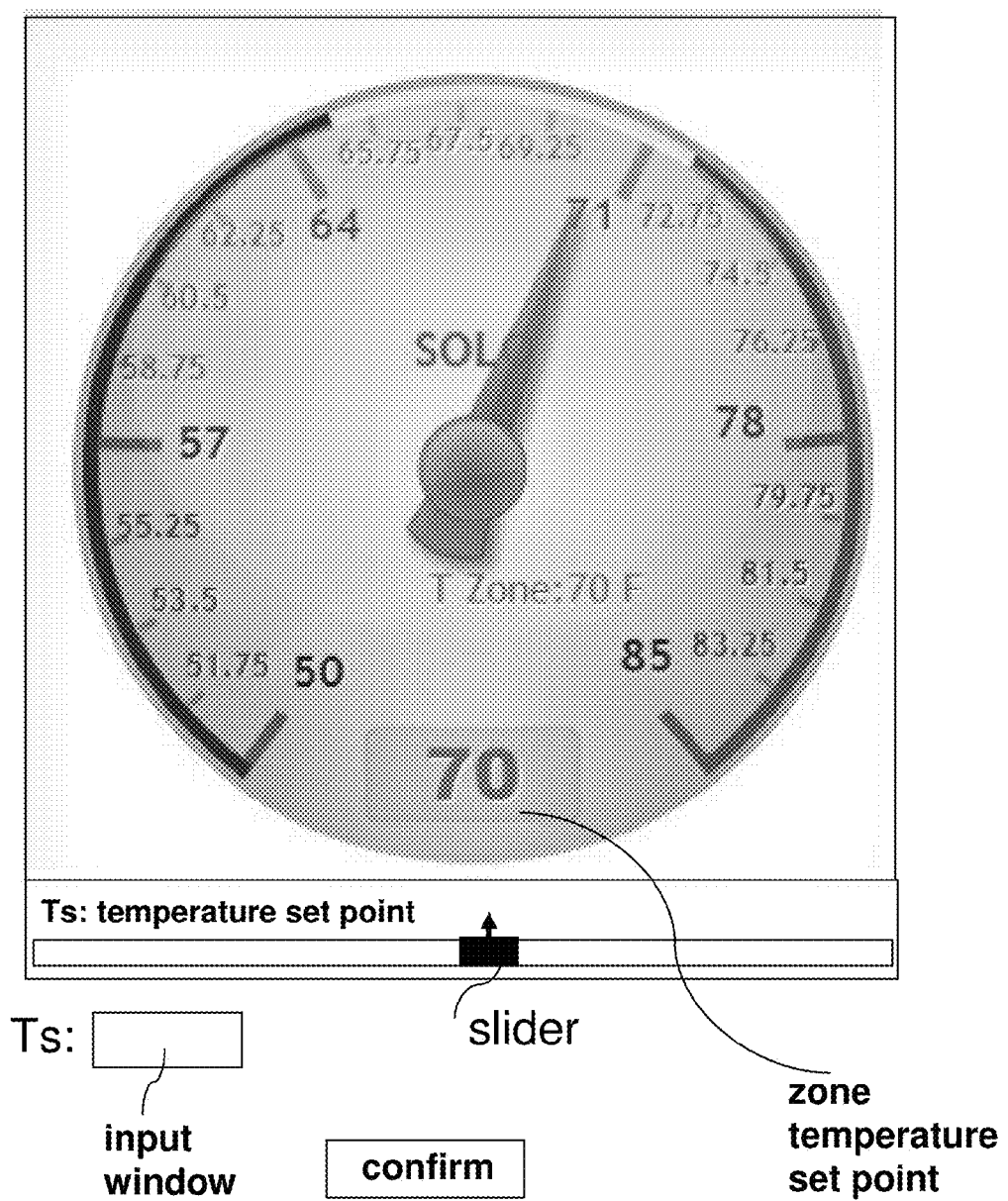
FIG. 3 illustrates a user interface in accordance with various aspects of the present invention.

One possible interface of a softThermostat SOLO is shown in FIG. 3. Occupants can adjust their temperature preference for instance via the dial at the left. One other way to adjust the temperature is with the slider, or by entering a temperature into an input window. If the temperature preference is energy efficient, the dial, the slider or the input window is green. If the preference requires excessive energy consumption, the dial, the slider or the input window is red.

According to ASHRAE standard 55-2010, the summer suggested temperature is between 74° F. to 78° F. and the winter recommend temperature is between 70° F. to 74° F. The thermostat shows green if user's input set point is within the range. If the set point is out of the range, then the thermostat shows red. This design intends to give occupants visual feedback and encourage energy-awareness. Feedback on the effects of a requested temperature setting can be provided in different ways.

The system in one embodiment of the present invention provides also a number, for instance estimated cost of a setting, an icon (for instance thumbs up for an energy saving temperature) or any other visual or audio energy saving feedback that indicates to a user what the energy consumption consequences are of a requested temperature. A confirm button enables an occupant to confirm a temperature choice. A processor will then instruct one or more climate control devices to apply settings related to the calculated temperature setting which is based on the earlier and later herein discussed constraints.

Occupants often occupy locations such as cubicles or even offices that are part of a climate zone. It is impossible to substantially change a setting for one location in a zone without affecting another part. Or a setting in one zone can affect an adjacent zone. That is why preferences of different occupants in a zone and in adjacent zones have to be coordinated.

The zone temperature set point is shown as the text at the bottom of the dial. The set point is calculated due to comprehensive considerations on current occupant's preference, adjacent occupants' preference and rules from facility managers. Calculations further include actual outside conditions such as outdoor temperature, time of day, etc. Calculations may be based on a physical model of the facility.

Figure 4:
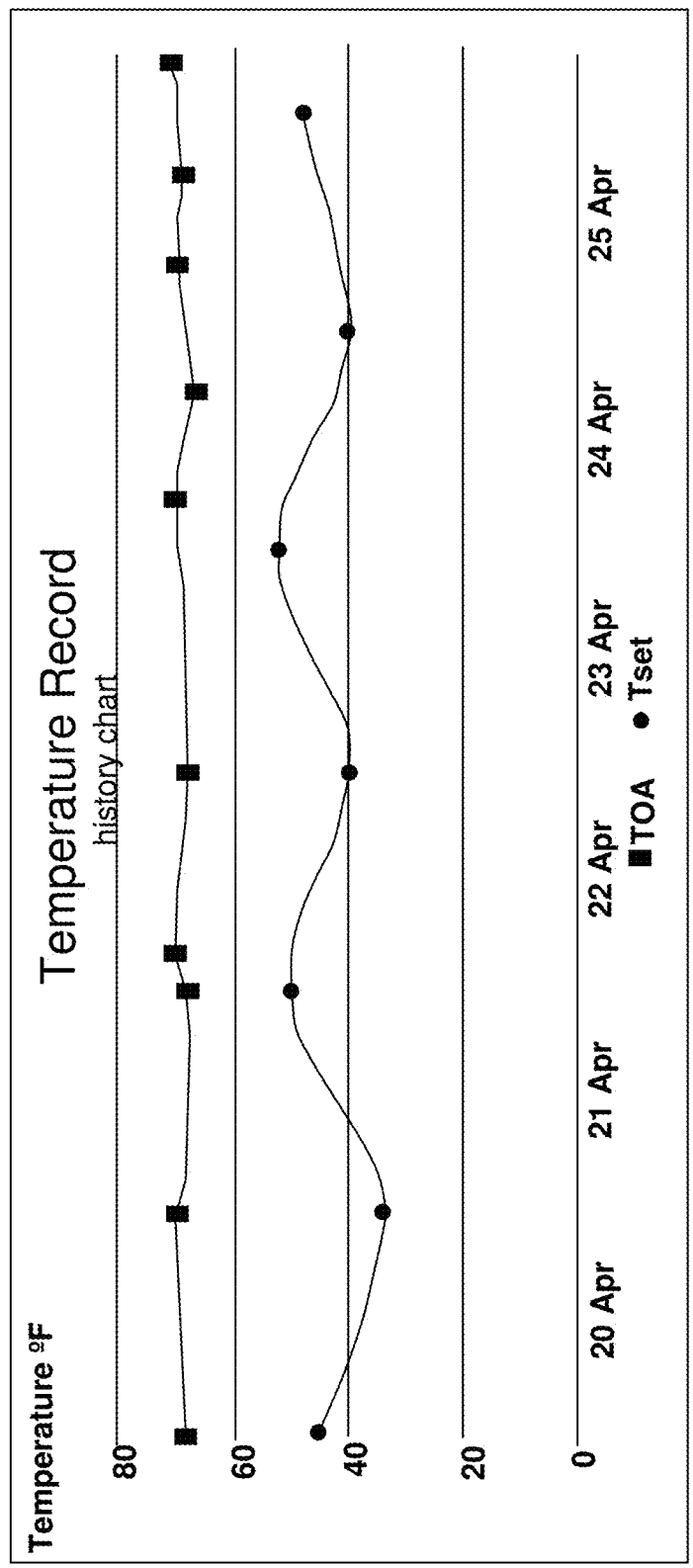
FIG. 4 illustrates an energy dashboard in accordance with various aspects of the present invention.

Historical temperature set points and outdoor temperature are shown on a dashboard illustrated in FIG. 4.

Schedule and Set Point Learning

Input daily schedule and preference can be a tedious task for occupants. In accordance with an aspect of the present invention a softThermostat such as SOLO improves usability by learning occupants' preference and calendar whenever occupants use the system. The business logic of SOLO is implemented in an XML file with embedded script, such as Python, but it can be implemented on other computer languages.

The XML capture the discrete events, such as the coming and leaving time. Occupants can enter their preferences and events (arriving/leaving office). The schedule learning and preference learning can be configured by the facility manager, where today's event time can be moving averages of previous days.

Figure 5:
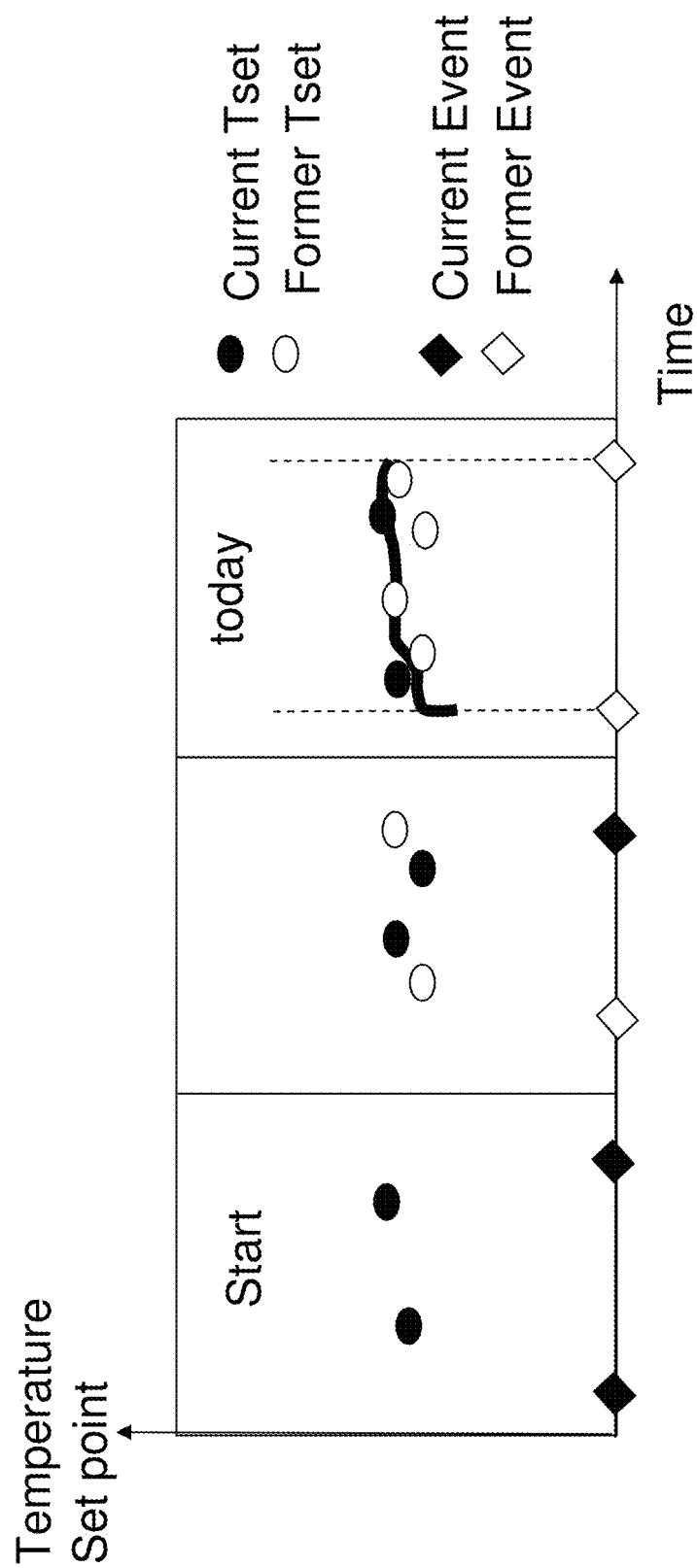
FIG. 5 illustrates a learning process in accordance with various aspects of the present invention.

Today's temperature preference curve is fitted curve based on former temperature preference set points. For every occupant, one SOLO generates a temperature preference every one minute, as if a personal agent for the occupant as illustrated in FIG. 5. The learning mechanism is a social activity because the neighbor's preferences are considered during the learning process. For example, if the max zone temperature difference is 2° F., the Arbitrator will change the occupants' preference as small as possible, such that the difference among zone temperature set points that sent to the BAS are within 2° F. difference.

It is noted that the 2° F. difference is an illustrative embodiment of the present invention. Inter-zone and intra-zone temperature differences can be greater than 2° F., they can also be smaller. In one embodiment of the present invention an inter-zone temperature difference is configurable by facility manager. In one embodiment of the present invention an inter-zone temperature difference is not greater than 5° F.

In one embodiment of the present invention a profile of an occupant is stored in a memory. The profile indicates a general presence of the occupant in the building. For instance the occupant is present in the building at the location Monday-Friday from 9.15 am-5.30 pm. The occupant generally takes a break from 12.30 pm-1.15 pm and is away from the location. The occupant may be away several times per month due to travel. If away, the occupant is generally away during the entire day. The occupant has as a preference for a location temperature of 72° F. when outside temperatures are over 75° F. and a preference for a location temperature of 73° F. when outside temperatures are lower than 65° F. For outside temperatures between 65° F. and 75° F., occupant prefers the settings of the previous day the location was occupied. After lunch break, occupant prefers a temperature that is 2° F. lower than in the morning for about 1 hour and then goes back to the preferred temperature. All these data are included in the occupant profile which is stored and can be accessed and used by the CECC.

The profile is activated by the system when occupant is present at the location. In one embodiment of the present invention the system can determine automatically if the occupant is present in the facility. Such determination can be made by data from a security system. For instance, an occupant carries a security tag that activates a sensor when entering a building and this activates the occupant's profile in the CECC. An activation can also take place by an application on a personal or assigned computer device. For instance, many facilities have a network that requires a sign-on. As soon as the occupant signs-on to the network the related profile is activated. Other automatic detection methods are possible and are contemplated. In a further embodiment of the present invention an occupant activates a profile by signing-on to a CECC system.

Figure 9:
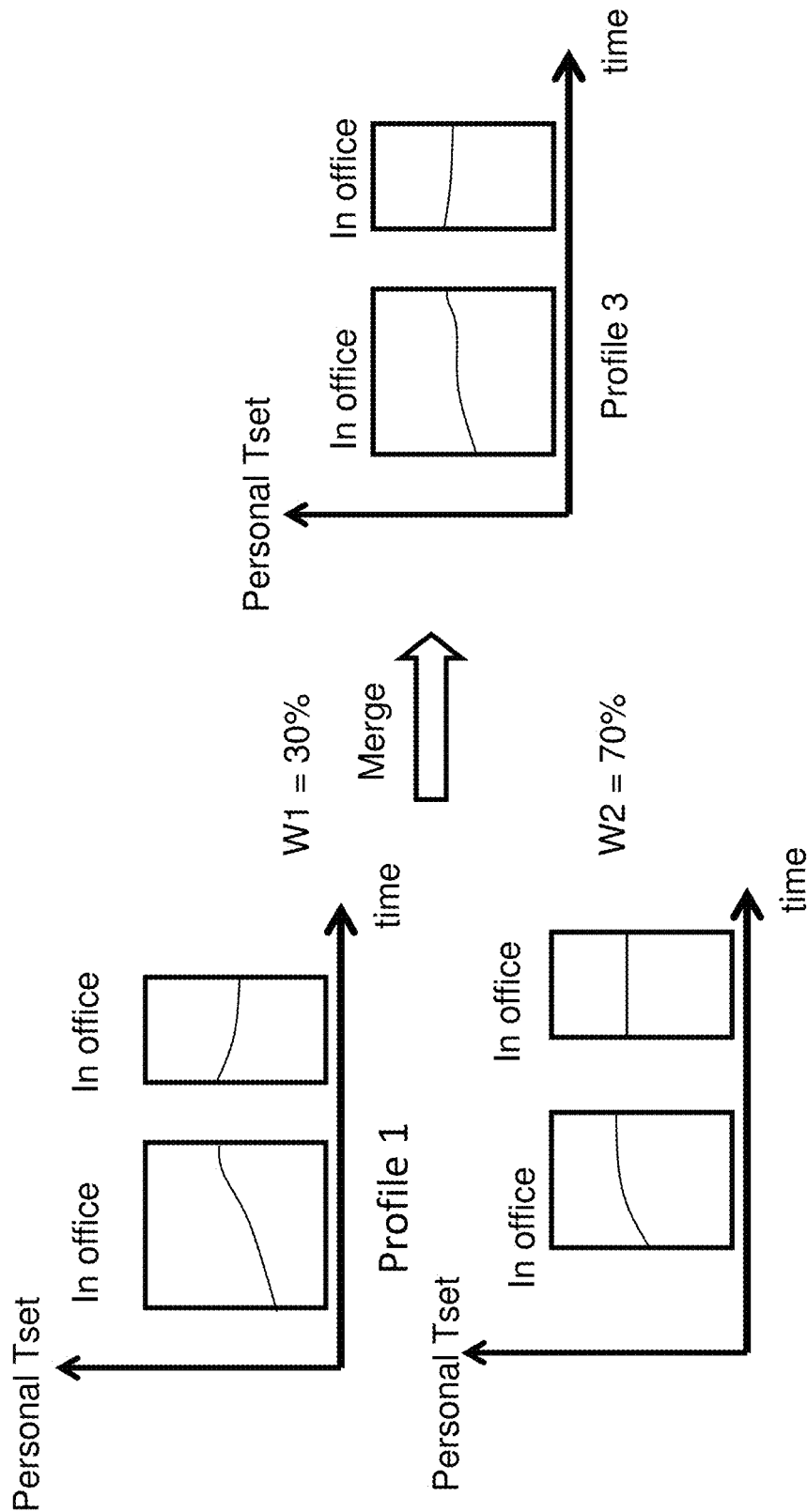
FIG. 9 illustrates temperature profile merging in accordance with one or more aspects of the present invention.
Figure 12:
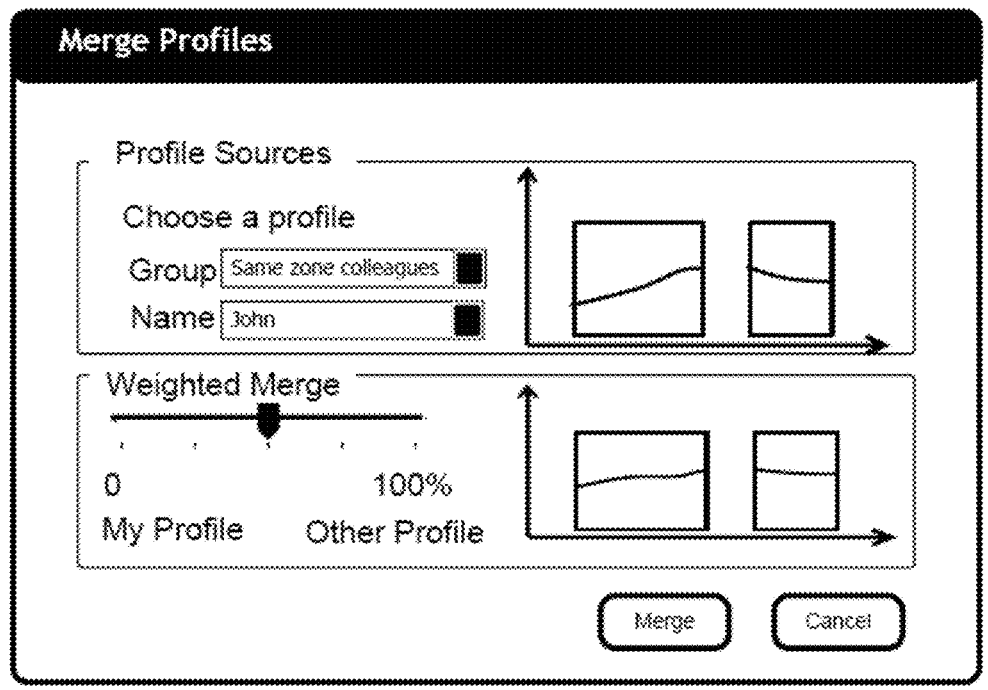
FIGS. 12 and 13 illustrate user interfaces in accordance with one or more aspects of the present invention.

Nowadays, many companies or organizations have multiple facilities and offer the opportunity of hoteling or unassigned office space with network connection for visitors, visiting employees from other facilities or employees that generally work from home or other locations. In accordance with an aspect of the present invention an employee has a climate profile or can select a climate profile from pre-set climate profiles. To avoid spend time to train the thermostat, visitors can select an existing profile or merge existing profiles provided by the system. For example, FIG. 9 shows that a user merges Profile 1 with 30% weight factor and Profile 2 with 70% weight factor to Profile 3, which is in between Profiles 1 and 2, but closer to Profile 2, because Profile 2 has a larger weighting factor. Merging two profiles is one embodiment of the profile merging feature. Users can merge N profiles with N weight factor, with N any integer equal or greater than 1. A user interface for profile merging is illustrated in FIG. 12.

Figure 13:
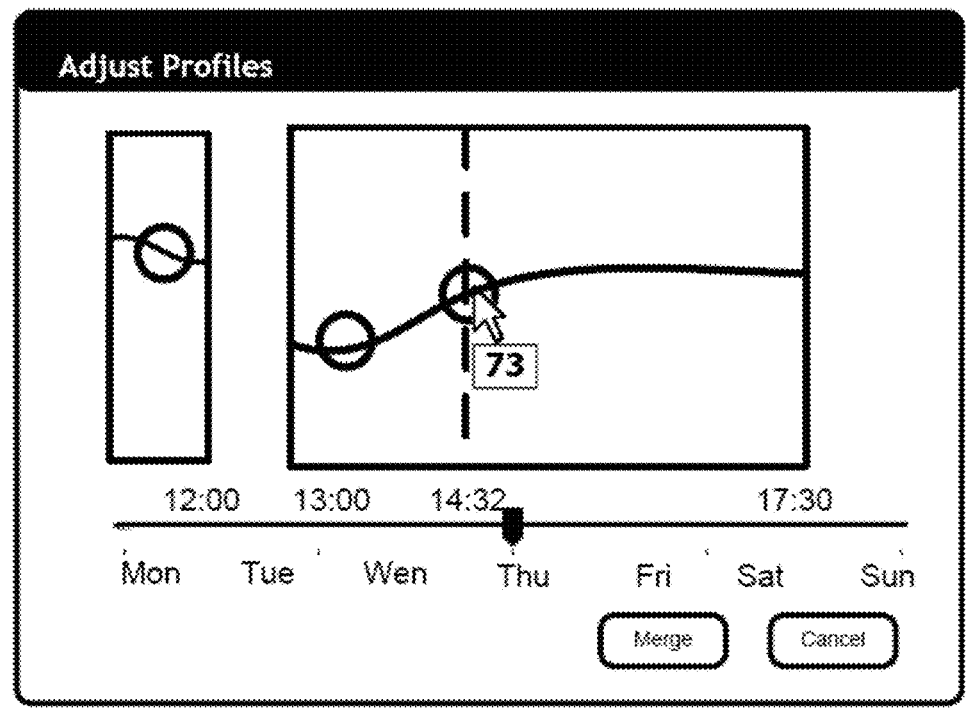

In accordance with one aspect of the present invention an employee who just starts with a company or who moved into a new building can start with an initial profile that may be a standard profile that is for instance downloaded from a website or from a social network website. A user who is authorized may edit a profile for instance by moving temperature points higher or lower. In one embodiment of the present invention, a user cannot move a temperature any further than conditions determined by an energy policy or by any other pre-set temperatures. For instance in the winter the highest allowed setpoint is 76° F. and in summer the lowest allowed setpoint is 67° F. under what may be called a generous energy policy. Under a more restrictive energy policy in the winter the highest allowed setpoint is 74° F. and in summer the lowest allowed setpoint is 69° F. Under an even more restrictive energy policy in the winter the highest allowed setpoint is 73° F. and in summer the lowest allowed setpoint is 70° F. A user interface for profile editing is illustrated in FIG. 13.

While the energy policy allows an entry of certain preferred temperatures by an occupant of a location, certain zone constraints still may require the preferred occupant profile to be resolved by the automatic arbitrator or by collaborative exchange between two occupants on a website to resolve conflictive preferences.

In certain cases a location of an occupant is a closed or closable room or office. In that case preferences or a profile of an occupant that in compliance with preset constraints are the actual settings accepted for that occupant by the BAS to regulate the temperature of the room or office for that occupant. An occupant may move from a first room to a second room, wherein the rooms are in the same facility or building or in different buildings. Each building may have its own constraints. However, the profile of the occupant is applied by a BAS to regulate the temperature of the room occupied by the occupant, if necessary within predetermined constraints.

It is noted that many people working in private or single occupant offices observe an "open door" policy to facilitate interaction with other employees. In that case it is not advantageous to allow an occupant to apply preferred profile settings only restricted by BAS constraints. Because heat easily exchanges through the open door opening a multi-zone situation exists and a conflictive situation may exist between the room and the zone outside the room connected by the door opening. The arbitrator will in that case resolve any conflictive situation in a manner as described herein.

Once an occupant profile has been determined, it can be applied when an occupant occupies a location, room or office, or within a reasonable time when the occupant is about to enter the location. When an occupant has left a location no additional heating or cooling is required and a neutral profile is executed that leaves the location in a preset temperature. For instance at night, in the weekend or during standard non-working hours a preferred neutral profile may be executed by the BAS.

In accordance with an aspect of the present invention, an occupant profile is executed based on a known or preferred schedule of occupant. Occupant enters additional vacation days or personal absence days that are applied by the BAS system to run the profile. Many buildings have a security system that administers a presence of an employee. In accordance with an aspect of the present invention a profile of an occupant is automatically executed by the BAS when the presence of the occupant is confirmed, for instance by the security system. An occupant is many cases is connected to a network by a personal sign-in. Such sign-in (usually with a user name and password) to a server can be used by the BAS to execute the occupant profile. Another way is to have a profile stored on a computing device, such as a mobile computing device or on a server. A user may activate the profile by an activation command that is recognized by a server that is connected to the BAS.

A profile in accordance with an aspect of the present invention is an optimized temperature profile. That is, it is arbitrated and optimized relative to a building with its BAS and a location in a building and its conflictive demands from other users, energy policy and physical constraints. A temperature profile of a user or occupant in one embodiment on the present invention also contains the preferred temperature setting for the occupant. The arbitrated setting may be higher or lower than preferred based on the arbitration and the location. In a different location in the building or in a different building the arbitration may be different. For instance, when the occupant moves in a single room or office the actual setting may follow the preferred temperature. One constraint in that case may be the extra energy cost, which may be charged to the occupant if occupant agrees.

The occupant in one embodiment of the present invention edits or extends the profile to an evening or "at home" profile, thus establishing a 24 hour temperature profile. Temperature constraints may also exist at home, but with different weights and based on different locations at home and based on different occupants of the house. For instance, a house does need to be heated in each room if only one person is in a home office. Clearly, different constraints come into play when a second person is an a living room with a first preferred temperature and a second person is in a home office with a second preferred temperature. A house with selectively controlled temperatures in different locations in the house thus can apply methods for arbitration as provided herein.

A profile may be stored on a social network server and may be shared with a BAS system of a facility that is to be visited by the owner of the profile. For instance, an owner of a profile may make a reservation for a room in a hotel. Separately or as part of the reservation the profile is made available to the BAS of the hotel. At or close to check-in into the hotel by the owner of the profile the profile of the owner is activated by the BAS of the hotel. It may be that the profile has a demand that is more energy consuming than a standard energy of the hotel allows. The owner of the profile may be allowed to buy additional comfort by authorizing the hotel to charge additional fees for exceeding energy limits, thus allowing full activation of the profile. If the owner does not authorize additional fees, the profile will be executed within the limits of the constraints set by the hotel.

In one embodiment of the present invention a facility has at least three climate zones that can be individually controlled. The BAS or other physical limitations constrains a temperature difference of not more than 2° F. between adjacent zones. This may allow a temperature difference of 4° F. between two non-adjacent zones. For instance one part of the facility is in the sun and may be considered a hot zone. Another part of the facility may be on a shadowy side of the building and may be considered a cold zone. Rather than cooling the hot zone or heating the cold zone, the CECC may assign occupants or hoteling guests based on their profile or preferences. The constraints of each zone will be set that it does not allow excessive cooling or heating.

In accordance with an aspect of the present invention a mathematical optimization method is provided to minimize discomfort yet satisfy constraints subject to hardware and facility manager. The following temperature arbitration algorithm captures the "social" perspective of the invention.

Figure 10:
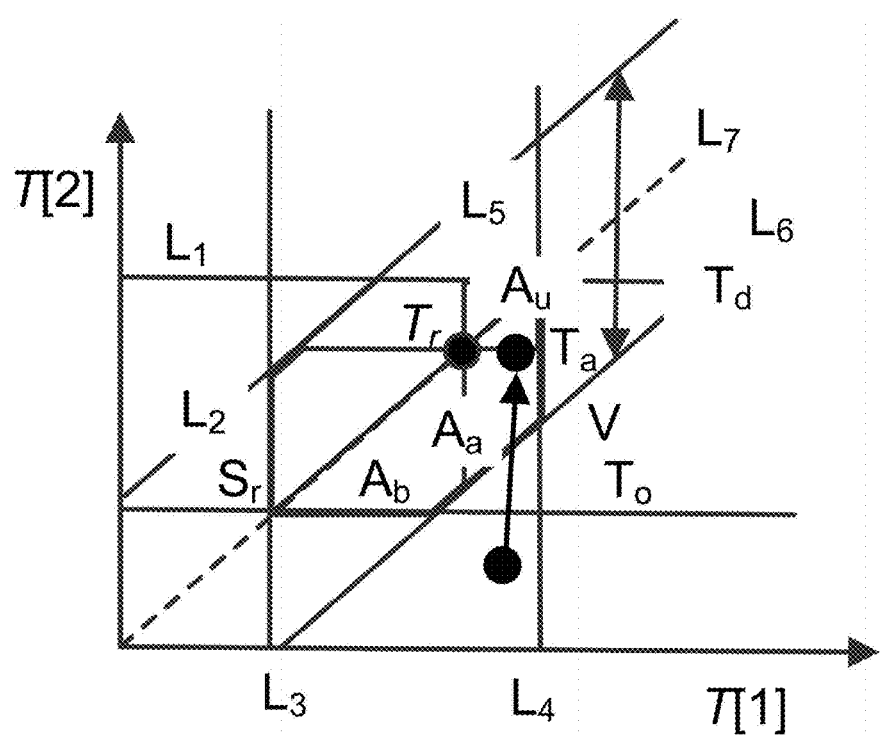
FIGS. 10 and 11 illustrates zone temperature arbitration in accordance with one or more aspects of the present invention.

As shown in FIG. 10, the solution of zone temperature arbitration is not unique. Given the initialize occupants' temperature preference, $T_o$, not within the acceptable temperature area, $A_a$, there are infinite number of possible methods to map occupants' preference to arbitrated temperature set point, $T_a$, such that $T_a$ is within $A_a$. Therefore, it is valuable to have an optimization method, which finds the best solution based on certain criterion that defined by user. We present one optimization method f, which maps a given $T_o$ to a $T_a$ inside $A_a$ with the least variation v, which is defined as $v:=T_a-T_o$.

In other words, a function $T_a=f(T_o)$, such as $T_a \in A_a$ is implemented and $\|v\|$ is minimized. For more energy saving, a parameter $T_r$ is introduced, the reference temperature from facility manager, where $T_r$ is a parameter of f, i.e., $T_a=f(T_o; T_r)$. To illustrate the concept, a trivial two adjacent zone scenario is drawn in FIG. 10, where each zone has one occupant. The occupant's temperature reference is a vector $T_o$, defined by $T_o=[T_o[1]\ T_o[2]]^T$, where $T_o[1]$ and $T_o[2]$ are the preference from occupants 1 and 2, respectively. The zone temperature set points after arbitration are $T_a=[T_a[1]\ T_a[2]]^T$, $T_a[1]$ and $T_a[2]$ are the zone set points after arbitration.

The line $L_1$ is the upper limit on $T_a[1]$, such as 78° F. (25.6° C.). The acceptable region is area below this line, i.e., $T_a[1] \leq l_u$, where $l_u$ is the upper limit and $l_u=78$ in this case. The line $L_2$ is the lower limit, such as 68° F. (20° C.). The acceptable region is above this line, i.e., $T_a[1] \leq l_l$ where $l_l$ is the lower limit and $l_l=68$ in this case. The lines $L_3$ and $L_4$ are the lower and upper limit on $T_a[2]$ and they can be posed as a constraint of the same inequality form. Max temperature difference $T_d$ imposes two inequality conditions, i.e., $T_a[1]-T_a[2] \leq T_d$ (i.e., line $L_6$) and $T_a[2]-T_a[1] \leq T_d$ (i.e., line $L_5$). In FIG. 10, the area that satisfies all the fixed temperature constraints is $A_a$.

In order to give facility manager a tuning knob to balance between further energy saving and comfort, a facility manager is allowed to change $T_r$ based on a schedule. In summer, the additional constraints are $T_a[1] \geq T_r$ and $T_a[2] \geq T_r$, which is the convex upper area, $A_u$. In winter, the constraints are $T_a[1] \leq T_r$ and $T_a[2] \leq T_r$, where the convex area, $A_b$, at bottom of $A_a$ is a valid area for $T_a$. Facility managers can pick any $T_r$ within the range of $S_r$.

Since the notation is written in linear algebra, the problem can be generalized in an arbitrary number of zones and occupants and formulate it as a mathematical optimization problem, specifically, convex quadratic programming problem ([7] *Interior-point methods for large-scale cone programming* by M. S. Andersen, J. Dahl, Z. Liu, L. Vandenberghe; in: S. Sra, S. Nowozin, S. J. Wright (Editors) Optimization for Machine Learning, MIT Press, 2011), which is formulated as following:

Min $\|v\|_2$

Subject to $Gv \leq h$ where $v := T_a - T_o$; $v \in \Re^n$; n is the number of zones; $T_a \in A_u$; $T_o$ is the arbitrated single zone temperature set point1. Matrix G and vector h were constructed to capture the constraints applied to $A_u$ or $A_b$ in FIG. 10. The following equations are immediate:

$$\begin{bmatrix} sI \\ I \\ -I \\ Z_1 \\ Z_2 \\ \vdots \\ Z_{n-1} \end{bmatrix} T_a \leq \begin{bmatrix} sT_r \cdot 1 \\ l_u \cdot 1 \\ -l_l \cdot 1 \\ T_d \cdot 1 \\ T_d \cdot 1 \\ \vdots \\ T_d \cdot 1 \end{bmatrix}, \text{ so that}$$

$$\begin{bmatrix} sI \\ I \\ -I \\ Z_1 \\ Z_2 \\ \vdots \\ Z_{n-1} \end{bmatrix} v \leq - \begin{bmatrix} sI \\ I \\ -I \\ Z_1 \\ Z_2 \\ \vdots \\ Z_{n-1} \end{bmatrix} T_o + \begin{bmatrix} sT_r \cdot 1 \\ l_u \cdot 1 \\ -l_l \cdot 1 \\ T_d \cdot 1 \\ T_d \cdot 1 \\ \vdots \\ T_d \cdot 1 \end{bmatrix},$$

where s is 1 for winter and −1 for summer; 1 is an all one column vector; a zone permutation matrix $Z_1$ is defined as $$Z_i = \begin{bmatrix} 0 & \cdots & 1 & -1 & 0 & \cdots & 0 \\ 0 & \cdots & -1 & 1 & 0 & \cdots & 0 \\ 0 & \cdots & 1 & 0 & -1 & \cdots & 0 \\ 0 & \cdots & -1 & 0 & 1 & \cdots & 0 \\ \vdots & \vdots & \vdots & \vdots & \vdots & \vdots & \vdots \\ 0 & \cdots & -1 & 0 & 0 & \cdots & 1 \end{bmatrix},$$

↑i−th column where the non-zero entries start from the i-th column.

This provides $G = [I \; I - I \; Z_1 \; Z_2 \ldots Z_{n-1}]^T$ and $h = G \cdot T_o + [T_r \cdot 1 \; l_u \cdot 1 \; -l_l \cdot 1 \; T_d \cdot 1 \; T_d \cdot 1 \ldots T_d \cdot 1]^T.$ To solve the convex optimization problem, in one embodiment of the present invention, an open source Python library called CVXOPT (Anderson 2012) is applied. The energy consumption and occupants' responses is being monitored. The office has about 50 occupants and equipped with 10 terminal boxes. The terminal boxes have VAV fans and two stage electric reheat, with power ranged around 11 kW to 13 kW. Each terminal box is connected with one thermostat on the wall. Before the CECC installation, occupants are allowed to change temperature set points in about 1~2° F. range. After CECC installation, each occupant can type in their preference from 68 to 78° F. (20 to 25° C.). The max temperature difference after arbitration is about 5° F. (2.8° C.).

Figure 11:
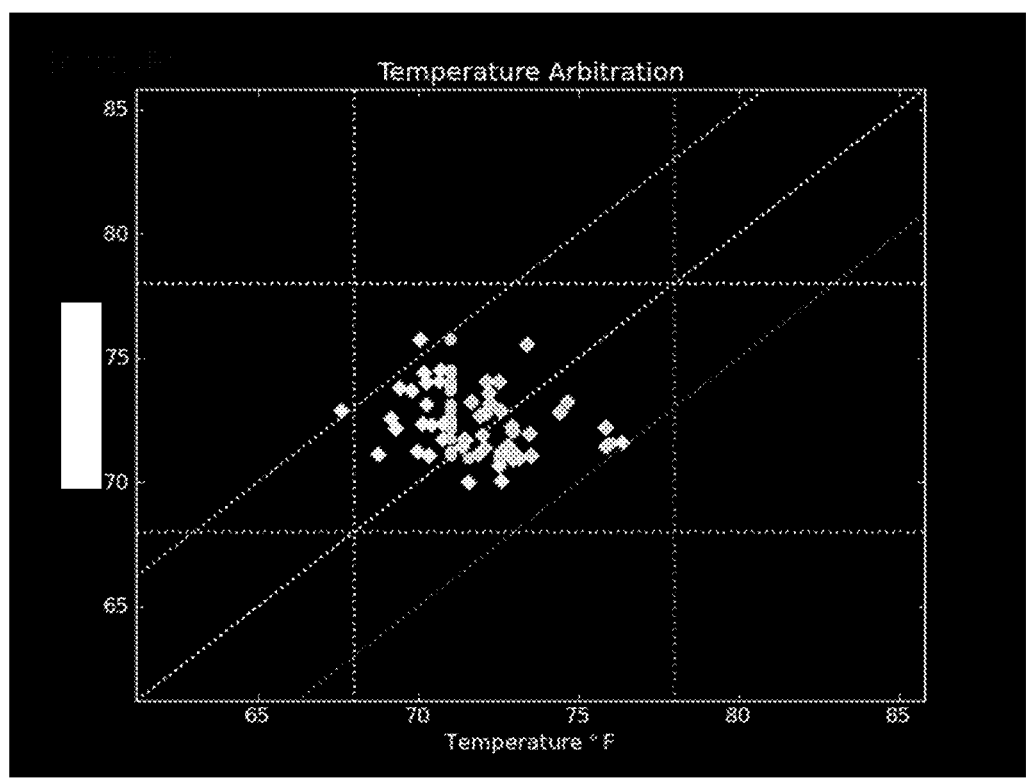

In FIG. 11, the impact of temperature arbitration based on simulation is estimated. If the occupant's preferred temperatures are subject to certain distribution with the expectation at 72° F., Tr is 71° F., then the arbitrated zone temperature set points are shown in circles in FIG. 11. The norm, max, and mean of temperature variation are followings $\|v\|_2=2.6$, max(|v|)=1.8, mean(|v|)=0.45. Under this case, with relatively small shifts on occupants' temperature preferences, all temperatures are posed within the area defined by facility manager, i.e., $A_a$ in FIG. 10.

In accordance with a aspect of the present invention, a system such as a Building Automation System (BAS) optimizes and arbitrates a multi-location climate control system based on users input, each user being associated with an own location and a preferred temperature, (a) in one embodiment of the present invention for 2 or more different locations in a facility; (b) in a further embodiment of the present invention for 5 or more different locations in a facility; (c) in yet a further embodiment of the present invention for 10 or more different locations in a facility; and (d) in yet a further embodiment of the present invention for 50 or more different locations in a facility.

For large numbers of users and large numbers of climate control devices optimization may become more time consuming. However, it is reasonable to expect that the preferences of users will be fairly consistent and constant and that vary in a fairly predictable way during the seasons. Based on data collected over several months, or seasons or years, a system probably has a fairly stable set of preferences and calculated arbitrations of temperatures. Preferred settings may change as outside temperatures vary. In accordance with an aspect of the present invention a plurality of arbitrated settings for a workplace is stored on a computing device, and being retrievable based on an outside temperature. Accordingly, when it is hot and humid outside, the BAS automatically retrieves and implements an already arbitrated facility profile that covers a plurality of locations with preferred temperatures, rather than requesting preferred temperatures from users and optimizing and arbitrating the requested preferred settings.

Users can still submit their preferred settings if so desired. It may be that previous users have left the organization, new users joined or preferences have changed. However, it is assumed that many individual profiles have remained the same. This allows the BAS to implement an overall temperature profile of a plurality of locations that will provide a majority of users sufficient comfort within the constraints of the system and energy policies while allowing the system to recalculate, if so desired, in real-time or off-line, a new arbitrated and optimized facility profile. Depending on the facility policy, a user may submit new preferred temperatures which in one embodiment of the present invention will be arbitrated off-line, for instance during the night and be implemented at a later stage, for instance the next day.

One aspect of temperature determination by a processor in the present invention is that the processor in general has to take into consideration constraints posed by conflictive demands originating from either (a) other occupant(s) (b) energy policy (c) pricing constraints (d) physical constraints or from a combination of these constraints. Thus another term for temperature determination herein is arbitration as the processor has to arbitrate between conflictive demands. The determined temperature after arbitration by the processor that will become the set point is called herein the arbitrated temperature. This is different from merely learning temperature preferences from an occupant.

The method in accordance with an aspect of the present invention can process an arbitrary number of occupants, arbitrary number of zones and any occupant to zone association relationships. The output is a set of zone temperature set points, which have the minimal difference to the occupants' original or preferred set points. Therefore, the occupants' discomfort is minimized Because the problem is solved using a convex optimization tool, mathematically, the optimal solution is always achievable, i.e., problem is always solvable.

Additional Details

All existing climate control system designs are static, closed systems, in terms that the control rules are hard coded. Only vendors can modify the control logic. If end users are not satisfied with the control logic, they need to either ask vendor to customize the product or implement logic from the beginning.

The system provided herein in accordance with an aspect of the present invention presents a novel dynamic, open occupant-engaged control platform, where users, either occupants or facility managers, can write control rules and load them at run time.

In one embodiment of the present invention, the system is part of an existing Building Automation System (BAS). In general BAS systems already have a processor. As an aspect of the present invention the processor is provided with a program that provides the arbitration as described herein, but applies existing control devices. In one embodiment of the present invention additional equipment is installed, such as additional controllable air ducts, to to provide more control options.

Collaborative Control Platform

Figure 6:
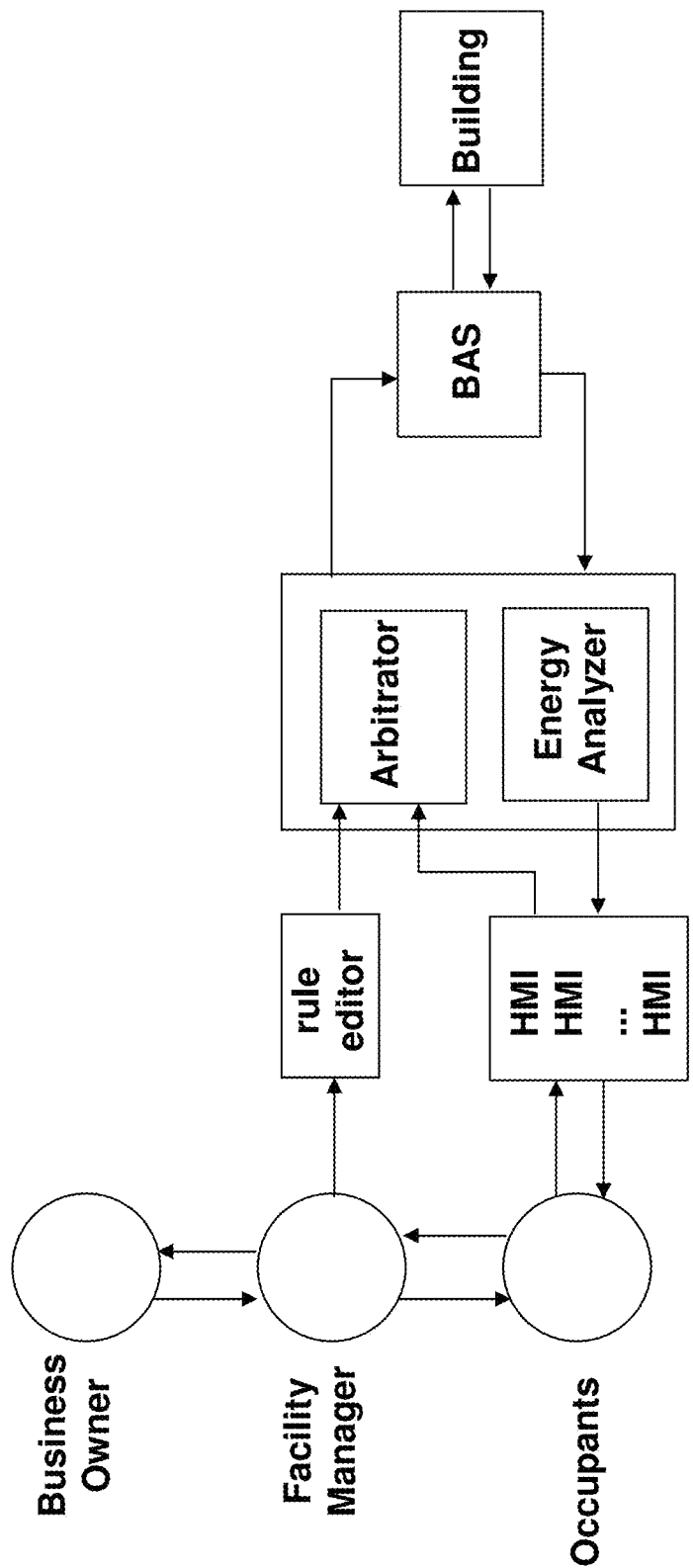
FIG. 6 illustrates a collaborative energy and comfort control system (CECC) in accordance with various aspects of the present invention.

As illustrated in FIG. 6, the CECC platform has at least two components: the front end user interface (UI) or Human-Machine Interface (HMI) and the back end Rule Engine. The web-based platform, collaborative HMI, is utilized to facilitate the communication between facility manager and occupants, and among occupants themselves. Social networking between occupants and facility manager is adopted to enhance communication as well as to prompt energy responsive behaviors. The heart of the back end is a Rule Engine that supports variations in control logic and conflict detection and resolution at run time. Therefore, requirements and control rules are captured by the HMI then loaded and executed by the Rule Engine directly. In previous systems, facility managers would have to hire professional software engineers to implement new requirements in software code, or contact vendor to customize hardcoded logics. That process is costly in terms of time and labor. One simplified case is described next. Assuming two occupants, V and S, in adjacent thermal zones, where the difference of those zone temperature set points cannot be more than 2° F., due to hardware limits and energy considerations. S and V can input their temperature setpoint to software Arbitrator by sliding a "thermo" bar on a user interface. The outputs of Arbitrator, depicted, are 74° F. and 76° F., respectively, and these are the value BAS received. Therefore, the 2° F. temperature constraint is satisfied. Once occupants change the set points, the estimated energy consumption changes accordingly. The estimation of energy use under the new setpoints is calculated by the Energy Analyzer in the back end engine. For deeper engagement, the back end engine also track individual occupant's energy consumption, even if they are sharing one thermal zone with others, the back end engine can estimate their energy usage. This estimated energy consumption is accessible from the rule files, so that facility managers can write credit-based energy policy for occupants in either partitioned cubicles or separated offices. For instance points can be awarded for a period of time that inputted setpoints comply with a desired energy policy.

One novelty of the Energy Analyzer provided in accordance with an aspect of the present invention is that it tracks individual occupant's Air Conditioning energy consumptions. In current commercial buildings, there is one A/C energy bill for the whole buildings, with hundreds of occupants or more. If the energy consumption goes up, it is not clear who shall take actions to reduce energy consumptions. In accordance with an aspect of the present invention, individual occupants AC energy savings are calculated with two steps. Note energy saving is defined as relative energy consumption with respect to a baseline defined by facility manager. 1) Sensors are used in each terminal box to calculate the energy inject to each zone, which may be shared by several occupants. 2) Based on occupants calendar, the zone AC energy bill is split to occupants at each sampling time instance, e.g., each 15 min.

One formula to calculate energy consumption is as follows: The energy saving due to temperature set point increase (in summer time) can be estimated with the following equation. Assuming all the heat is transferred as sensible heat, we can estimate the energy savings, $\dot{q}$ in unit of BTU/hr, due to temperature set point increase, $\Delta T$.

$$\dot{q} = \left[\frac{0.075 \text{ lb}_m}{\text{ft}^3}\right] \times V\left[\frac{\text{ft}^3}{\text{min}}\right] \times \left[\frac{60 \text{ min}}{\text{hr}}\right] \times \left[\frac{0.24 \text{ BTU}}{\text{lb}_m {}^\circ \text{F.}}\right] \times \Delta T =$$

$$1.08 \times V\left[\frac{\text{ft}^3}{\text{min}}\right] \times \Delta T$$

where V is the volume flow rate measured by cfm.

The facility manager can pre-set limits in how much an acceptable setpoint is allowed to deviate from a desired setpoint. Furthermore, conflictive situations between occupants can be automatically resolved by setting rules that determine the setting that provides the most energy savings. Furthermore, to prevent undesirable situations limits can be set below or above which no settings are allowed.

Because the inputs from occupants reflect long term behavior, one can determine the statistics of users and create warm zones and cool zones to accommodate occupants with "warm" and "cool" preferences.

If a location is not occupied then there is no occupant that requires a preferential setting. Accordingly, it would be beneficial for the system to know if a location is occupied. There are different ways to administer a location. One simple way is that the occupant has to activate his or her Occupant User Interface. If the UI is not activated the occupant is assumed to be not present and none of the previously provided data are assumed to be valid at that time until the occupant signs in. The Arbitrator thus does not have to consider any data related to that occupant for that specific time or time period when the occupant is not present.

In accordance with an aspect of the present invention each occupant has his or her own Occupant User Interface that has to be activated for instance by a log-in with a user name and a password. Accordingly, each Occupant User Interface is unique to a specific occupant. In general, each occupant is assigned a location in a facility. In accordance with an aspect of the present invention, each occupant in a facility is associated with a specific location, unless otherwise indicated or modified. For instance, an occupant may move permanently or temporarily to a new location in a facility. It may be assumed that at least initially the temperature preferences of the occupant in a new location are the same as in the previous location, thus allowing a system like a BAS to apply a profile with temperature preferences of the occupant related to the previous locations.

It is noted that there is a distinction between preferred temperatures and arbitrated temperatures. The profile of an occupant may contain preferred temperatures, arbitrated temperatures or both.

Software Architecture

The unique features in the front end call for a novel programming paradigm and an open software architecture.

From high-level perspective, the information flow is featured with a closed loop system, with feed forward channel from human to machines; and the feedback information from machines to human. The collaborative rule engine is hosted in the middleware, which instrument devices, HMI and external data sources, such as weather forecast, which can be used in control rule for predictive rule-based control. A weather forecast may be placed in the HMI.

Figure 8:
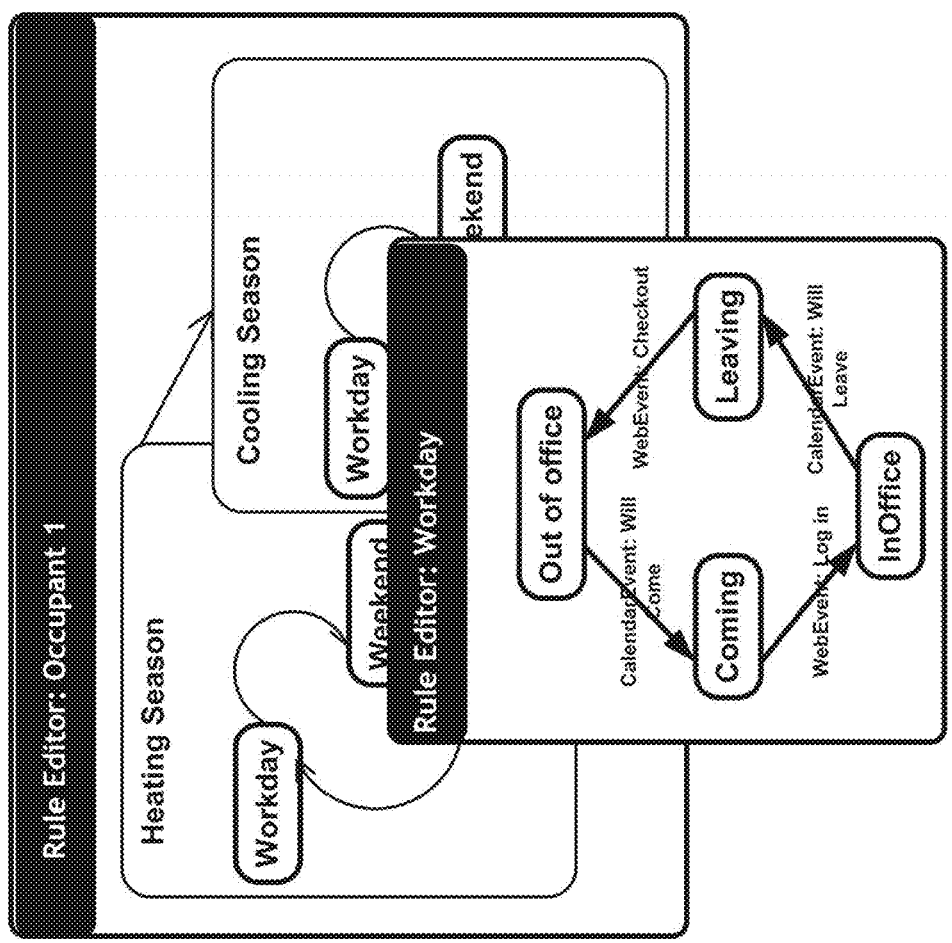
FIG. 8 illustrates a personal agent in accordance with one or more aspects of the present invention.

The rules executed in the Rule Engine is captured in XML-based text files and loaded at run time, i.e., read from hard drive "Rules" folder after the CECC software boots up. The rules can be categorized in to "App" and "Arbitrator" layers. The personal agents in the App layer feed set points to zone agents as if each occupant has a private assistant to adjust different settings at run time. One example personal agent is illustrated in FIG. 8, which enables pre-heating and pre-leaving strategies for energy savings. For example, the rule request heating started 30 minutes before V comes to his office and stops heating 30 minutes before he leaves for the day. The exact time duration is written in the text rule file, therefore configurable, even by users without programming skills. The system automatically calculates proper time to start and stop the building heating and cooling systems, by analyzing individual calendar.

The resource of each zone is configured in zone agent rule files. Once the rule file is loaded, a zone agent is aware of the limitations of local resources and the interface of the associated personal agents. For example, zone agent understands that only one zone temperature setpoint is acceptable and the setpoint should be within certainly ranges, depends on seasons, in order to avoid energy wastes.

Although not a part of the Rule Engine, a Rule Editor is tightly coupled with the engine, because the editor must follow the XML schema that the Rule Engine accepts. Users simply copy rule files to "Rules" folder and start the CECC platform. This novel "copy and run" feature enables rule configuration as easy as App installation on mobile devices. On current BASs, such control logic deployment may take days of manual work.

Figure 7:
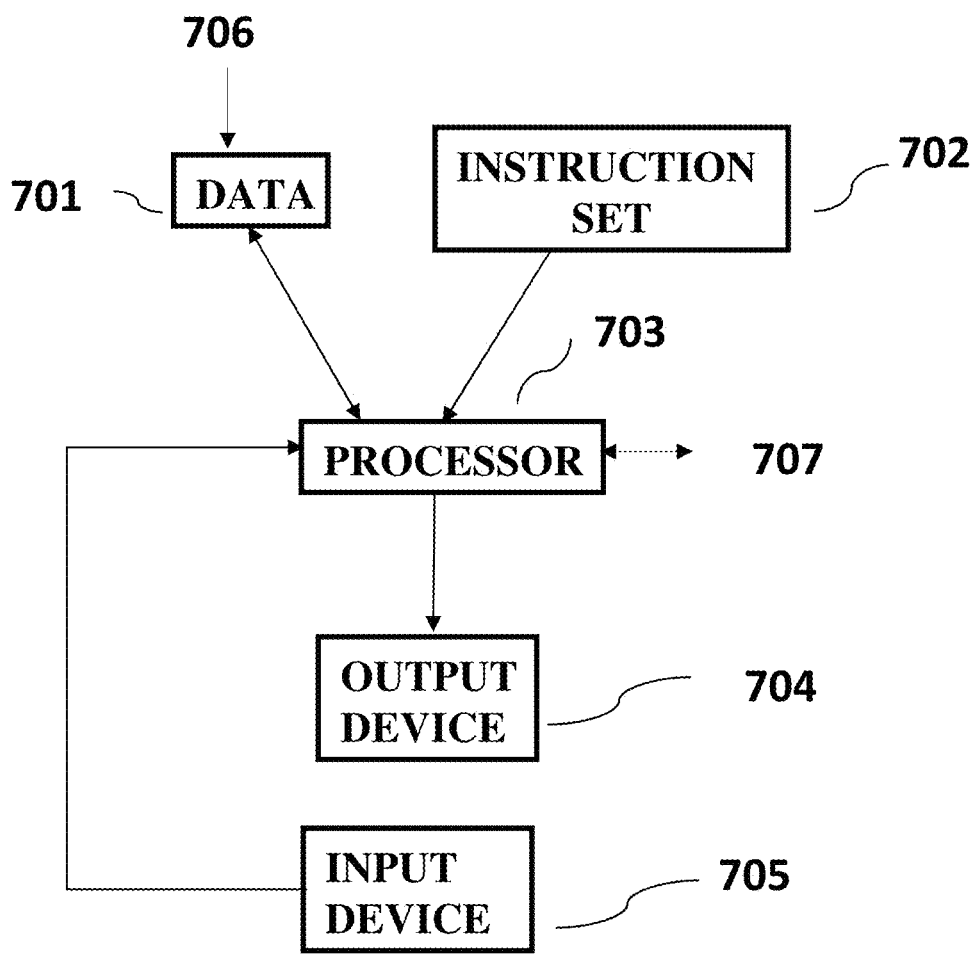
FIG. 7 illustrates a processor based system in accordance with various aspects of the present invention.

The methods as provided herein are, in one embodiment of the present invention, implemented on a system or a computer device. Thus, steps described herein are implemented on a processor in a system, as shown in FIG. 7. A system illustrated in FIG. 7 and as provided herein is enabled for receiving, processing and generating data. The system is provided with data that can be stored on a memory 701. Data may be obtained from an input device. Data may be provided on an input 706. Such data may be data provided by users via a user interface, by sensors in the building or from a data base or any other source that would contribute to determining a user profile or a temperature setpoint. The processor is also provided or programmed with an instruction set or program executing the methods of the present invention that is stored on a memory 702 and is provided to the processor 703, which executes the instructions of 702 to process the data from 701. Data provided by the processor can be outputted on an output device 704, which may be a display to display images or data or a data storage device. The processor also has a communication channel 707 to receive external data from a communication device and to transmit data to an external device, for instance to a BAS device or a climate control device. The system in one embodiment of the present invention has an input device 705, which may include a keyboard, a mouse, a pointing device, or any other device that can generate data to be provided to processor 703.

The processor can be dedicated or application specific hardware or circuitry. However, the processor can also be a general CPU or any other computing device that can execute the instructions of 702. Accordingly, the system as illustrated in FIG. 7 provides a system for processing data and is enabled to execute the steps of the methods as provided herein in accordance with one or more aspects of the present invention.

The following references provide background information generally related to the present invention: [1] Optimize Energy Use, by the *Whole Building Design Guide (WBDG) Sustainable Committee* [Online] Available: <http://www.wbdg.org/design/minimize_consumption.php>; [2] Heller, J., Morgan Heater, and Mark Frankel, Sensitivity Analysis: Comparing the Impact of Design, Operation, and Tenant Behavior on Building Energy Performance. NBI, New Buildings Institute, 2011; [3] G. Gao and K. Whitehouse, "The self-programming thermostat: optimizing setback schedules based on home occupancy patterns." in Proceedings of the First ACM Workshop on Embedded Sensing Systems for Energy-Efficiency in Buildings, ser. BuildSys '09. New York, N.Y., USA: ACM, 2009, pp. 67-72. [Online]. Available: <http://dx.doi.org/10.1145/1810279.1810294>; [4] Bowman, M., Debray, S. K., and Peterson, L. L. 1993. Reasoning about naming systems. *ACM Trans. Program. Lang. Syst. IS,* 5 (November 1993), 795-825. DOI=http://doi.acm.org/ 1 0.1145/161468.16147; [5] L. Kramer, "Comprehensive energy management and CC at DFW airport," in International Conference for Enhanced Building Operations (ICEBO), New York City, 2011; [6] Heller, J., Morgan Heater, and Mark Frankel, 2011. Sensitivity Analysis: Comparing the Impact of Design, Operation, and Tenant Behavior on Building Energy Performance. NBI, New Buildings Institute and [7] *Interior-point methods for large-scale cone programming* by M. S. Andersen, J. Dahl, Z. Liu, L. Vandenberghe; in: S. Sra, S. Nowozin, S. J. Wright (Editors) Optimization for Machine Learning, MIT Press, 2011.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A method for determining in a first building with a first location and a second location a first temperature setting of a climate control device enabled to affect the first and the second location, comprising:

a processor enabled to receive from a first user interface via a first soft thermostat embodied in a first instance of a software application allocated to a first user on a first computing device an instruction for a preferred temperature for the first location and the processor enabled to receive from a second user interface via a second soft thermostat embodied in a second instance of the software application allocated to a second user on a second computing device an instruction for a preferred temperature for the second location; and the processor arbitrating the received preferred temperature settings based on a constraint to set the climate control device to determine a first arbitrated temperature setting as the first temperature setting, wherein the arbitrating is based on an optimization criterion that minimizes a difference between the preferred temperature of the first location and the first arbitrated temperature setting and the preferred temperature of the second location and the first arbitrated temperature setting.

2. The method of claim 1, wherein the constraint is based on an energy policy.

3. The method of claim 1, wherein the constraint is based on an input provided by a facility manager.

4. The method of claim 1, wherein the preferred temperature of the first location is applied by the processor to create a temperature profile of an occupant of the first location.

5. The method of claim 4, wherein the temperature profile of the occupant is accessible through/from a social network.

6. The method of claim 4, wherein a second temperature setting of the climate control device is based on the temperature profile of the occupant.

7. The method of claim 4, further comprising:
the occupant occupying a third location in the first building; and
the processor accessing the temperature profile of the occupant to determine a temperature setting of a climate control device related to the third location.

8. The method of claim 4, wherein the occupant is enabled to change the temperature profile.

9. The method of claim 4, further comprising:
setting a temperature by a system for climate control in a second building by accessing the temperature profile of the occupant through the network.

10. The method of claim 1, wherein the processor determines the first arbitrated temperature setting based on preferred temperatures of at least 5 different locations in the building.

11. The method of claim 1, wherein the processor is part of an existing Building Automation System (BAS).

12. The method of claim 1, wherein the first location is in a first zone in the first building and the constraint is based on a temperature difference between the first location and the second location in the first building.

13. A system to determine in a first building with a first location and a second location a first temperature setting of a climate control device enabled to affect the first and the second location, comprising:
a memory enabled to store data, including instructions;
a processor enabled to execute instructions retrieved from the memory to perform the steps:
receiving from a first user interface via a first soft thermostat embodied in a first instance of a software application allocated to a first user on a first computing device an instruction for a preferred temperature for the first location and the processor enabled to receive from a second user interface via a second soft thermostat embodied in a second instance of the software application allocated to a second user on a second computing device an instruction for a preferred temperature for the second location; and
arbitrating the received preferred temperature settings based on a constraint to set the climate control device to determine a first arbitrated temperature setting as the first temperature setting, wherein the arbitrating is based on an optimization criterion that minimizes a difference between the preferred temperature of the first location and the first arbitrated temperature setting and the preferred temperature of the second location and the first arbitrated temperature setting.

14. The system of claim 13, wherein the preferred temperature of the first location is applied by the processor to create a temperature profile of an occupant of the first location.

15. The system of claim 14, wherein the temperature profile of the occupant is accessible through a social network.

16. The system of claim 14, wherein a second temperature setting of the climate control device is based on the temperature profile of the occupant.

17. The system of claim 13, wherein the processor is part of an existing Building Automation System (BAS).

* * * * *